(12) United States Patent
Chkodrov et al.

(10) Patent No.: US 7,693,916 B2
(45) Date of Patent: Apr. 6, 2010

(54) CORRELATING PROCESS INSTANCE DATA ACROSS MULTIPLE APPLICATIONS

(75) Inventors: Gueorgui Bonov Chkodrov, Redmond, WA (US); Richard Zachary Jason, Seattle, WA (US); Eric Anthony Reel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 10/750,885

(22) Filed: Jan. 5, 2004

(65) Prior Publication Data

US 2005/0149475 A1    Jul. 7, 2005

(51) Int. Cl.
G06F 17/00 (2006.01)
(52) U.S. Cl. ...................... 707/804; 707/944
(58) Field of Classification Search .............. 707/104.1; 705/35
See application file for complete search history.

(56) References Cited

U.S. PATENT DOCUMENTS

| | | | | |
|---|---|---|---|---|
| 5,581,691 | A * | 12/1996 | Hsu et al. | 714/15 |
| 5,890,140 | A * | 3/1999 | Clark et al. | 705/35 |
| 5,924,103 | A * | 7/1999 | Ahmed et al. | 707/201 |
| 6,856,970 | B1 * | 2/2005 | Campbell et al. | 705/35 |
| 6,934,714 | B2 * | 8/2005 | Meinig | 707/102 |
| 7,035,877 | B2 * | 4/2006 | Markham et al. | 707/200 |
| 7,062,513 | B2 * | 6/2006 | Beck et al. | 707/104.1 |
| 2002/0038228 | A1 * | 3/2002 | Waldorf et al. | 705/7 |
| 2002/0095237 | A1 * | 7/2002 | Parry | 700/233 |
| 2002/0170035 | A1 * | 11/2002 | Casati et al. | 717/127 |
| 2003/0146911 | A1 * | 8/2003 | Nakanishi | 345/211 |
| 2004/0024782 | A1 * | 2/2004 | Chamberlain | 707/104.1 |
| 2004/0044642 | A1 * | 3/2004 | Fujii et al. | 707/1 |
| 2004/0064351 | A1 * | 4/2004 | Mikurak | 705/7 |
| 2004/0117383 | A1 * | 6/2004 | Lee et al. | 707/100 |

OTHER PUBLICATIONS

Alex Dekhtyar et al., "Probabilistic Temporal Databases, 1: Algebra," ACM Transactions on Database Systems (TODS), vol. 26, Issue 1, pp. 41-95 (Aug. 31, 2001).
Scott Flinn et al., "Coordinating Heterogeneous Time-Based Media Between Independent Applications." Proc. Of the third ACM International Conference on Multimedia, pp. 1-17 (Nov. 5-9, 1995).
G. Kappel et al., "A Behavior integrated Entity-Relationship Approach for the Design of Object-Oriented Databases," Inst. Of Electrical Engineers, pp. 311-328 (Elsevier Science Publishers, BV 1989).
Chung Le Viet et al., "Design and Implementation of a Relational Database Server in a heterogeneous Network Environment," Int'l Conf. On Data Engineering (Feb. 5-7, 1986), pp. 685-692 (IEEE Computer Soc. Press 1989).

* cited by examiner

*Primary Examiner*—John R. Cottingham
*Assistant Examiner*—Robert Timblin
(74) *Attorney, Agent, or Firm*—Workman Nydegger

(57) ABSTRACT

Instance data is transmitted for Payload/Milestone events and for Enable-Continuation events. Payload/Milestone event data contains information describing an instance and/or providing a time of one or more portions of the processing of an instance. Included in the Enable-Continuation event data is an identifier associated with an instance by a first application and an identifier associated with the same instance by another application. The identifiers are placed in a continuation data table which is used to index the appropriate record of an instance data table. Out-of-order data for an instance is hidden from view until sequentially prior data for the instance is received.

11 Claims, 15 Drawing Sheets

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | 1600 | 8:24am | 12:45pm |
| PO#124 | 8:30am | Seattle | 234 | 2840 | 8:45am | 1:20pm |
| PO#125 | 8:35am | Redmond | 87 | 970 | 9:05am | 2:30pm |
| PO#126 | 8:45am | Seattle | 450 | 5000 | 9:20am | 3:10pm |
| PO#127 | 8:55am | Redmond | 200 | 2500 | 9:30am | <NULL> |
| PO#128 | 8:57am | Seattle | 340 | 3900 | 9:20am | 3:05pm |
| PO#129 | 9:12am | Seattle | 120 | 1300 | 9:45am | <NULL> |
| PO#130 | 9:30am | Redmond | 25 | 350 | 10:15am | <NULL> |
| PO#131 | 9:45 | Seattle | 250 | 3000 | 10:35am | <NULL> |
| PO#132 | 10:00am | Redmond | 100 | 1100 | <NULL> | <NULL> |
| PO#133 | 10:15am | Seattle | 230 | 2800 | <NULL> | <NULL> |
| PO#134 | 10:25am | Redmond | 45 | 550 | <NULL> | <NULL> |
| ... | ... | ... | ... | ... | ... | ... |

PRIOR ART

FIG. 2

Step 1:

PO_InstanceData 32

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | <NULL> | <NULL> | <NULL> |
| ... | ... | ... | ... | ... | ... | ... |

Step 2:

PO_InstanceData 32

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | <NULL> | <NULL> | <NULL> |
| ... | ... | ... | ... | ... | ... | ... |

PO_Continuations 34

| ActivityID | ContinuationToken |
|---|---|
| ... | ... |
| PO#123 | SO#256 |
| ... | ... |

FIG. 5A

Step 3:

PO_InstanceData — 32

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | 1600 | <NULL> | <NULL> |
| ... | ... | ... | ... | ... | ... | ... |

PO_Continuations — 34

| ActivityID | ContinuationToken |
|---|---|
| ... | ... |
| PO#123 | SO#256 |
| ... | ... |

Step 4:

PO_InstanceData — 32

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | 1600 | 8:24am | <NULL> |
| ... | ... | ... | ... | ... | ... | ... |

PO_Continuations — 34

| ActivityID | ContinuationToken |
|---|---|
| ... | ... |
| PO#123 | C#97892 |
| ... | ... |

FIG. 5B

Step 5:

PO_InstanceData

| ActivityID | RecvTime | City | Quantity | PkgWeight | ShipTime | DeliveryTime |
|---|---|---|---|---|---|---|
| ... | ... | ... | ... | ... | ... | ... |
| PO#123 | 8:00am | Seattle | 150 | 1600 | 8:24am | 12:45pm |
| ... | ... | ... | ... | ... | ... | ... |

PO_Continuations

| ActivityID | ContinuationToken |
|---|---|
| ... | ... |
| | |
| ... | ... |

FIG. 5C

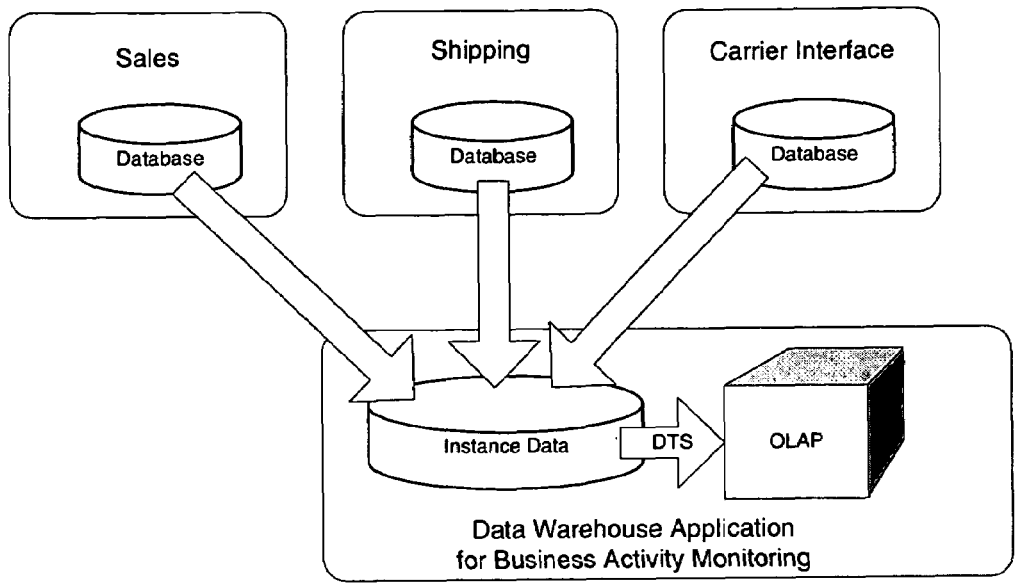

FIG. 6

| ActivityID | RecvTime | City | Quantity | PkgWeight | ShipTime | DeliveryTime |
|---|---|---|---|---|---|---|
| ... | ... | ... | ... | ... | ... | ... |
| C#97892 | <NULL> | <NULL> | <NULL> | <NULL> | <NULL> | 12:45pm |
| C#97893 | <NULL> | <NULL> | <NULL> | <NULL> | <NULL> | 1:20pm |
| C#97894 | <NULL> | <NULL> | <NULL> | <NULL> | <NULL> | 2:30pm |
| C#97895 | <NULL> | <NULL> | <NULL> | <NULL> | <NULL> | 3:10pm |
| SO#230 | <NULL> | <NULL> | 200 | 2500 | 9:30am | <NULL> |
| C#97897 | <NULL> | <NULL> | <NULL> | <NULL> | <NULL> | 3:05pm |
| SO#232 | <NULL> | <NULL> | 120 | 1300 | 9:45am | <NULL> |
| SO#233 | <NULL> | <NULL> | 25 | 350 | 10:15am | <NULL> |
| SO#234 | <NULL> | <NULL> | 250 | 3000 | 10:35am | <NULL> |
| PO#132 | 10:00am | Redmond | 100 | 1100 | <NULL> | <NULL> |
| PO#133 | 10:15am | Seattle | 230 | 2800 | <NULL> | <NULL> |
| PO#134 | 10:25am | Redmond | 45 | 550 | <NULL> | <NULL> |
| ... | ... | ... | ... | ... | ... | ... |

FIG. 7

Step 1

PO_InstanceData — 132

| IsVisible | IsCompleted | ActivityID | RecvTime | City | Quantity | PkgWeight | ShipTime | DeliveryTime |
|---|---|---|---|---|---|---|---|---|
| ... | ... | ... | ... | ... | ... | ... | ... | ... |
| 0 | 1 | C#97892 | <NULL> | <NULL> | <NULL> | <NULL> | <NULL> | 12:45pm |
| ... | ... | ... | ... | ... | ... | ... | ... | ... |

PO_Continuations — 134

| ActivityID | ContinuationToken |
|---|---|
| ... | ... |
| ... | ... |
| ... | ... |

Step 2

PO_InstanceData — 132

| IsVisible | IsCompleted | ActivityID | RecvTime | City | Quantity | PkgWeight | ShipTime | DeliveryTime |
|---|---|---|---|---|---|---|---|---|
| ... | ... | ... | ... | ... | ... | ... | ... | ... |
| 0 | 1 | C#97892 | <NULL> | <NULL> | <NULL> | <NULL> | <NULL> | 12:45pm |
| 0 | 0 | SO#256 | <NULL> | <NULL> | <NULL> | 1600 | <NULL> | <NULL> |
| ... | ... | ... | ... | ... | ... | ... | ... | ... |

PO_Continuations — 134

| ActivityID | ContinuationToken |
|---|---|
| ... | ... |
| ... | ... |
| ... | ... |

FIG. 9A

Step 3

PO_InstanceData — 132

| IsVisible | IsCompleted | ActivityID | RecvTime | City | Quantity | PkgWeight | ShipTime | DeliveryTime |
|---|---|---|---|---|---|---|---|---|
| ... | ... | ... | ... | ... | ... | ... | ... | ... |
| 0 | 1 | SO#256 | <NULL> | <NULL> | <NULL> | 1600 | 8:24am | 12:45pm |
| ... | ... | ... | ... | ... | ... | ... | ... | ... |

PO_Continuations — 134

| ActivityID | ContinuationToken |
|---|---|
| ... | ... |
| ... | ... |
| ... | ... |

Step 4

PO_InstanceData — 132

| IsVisible | IsCompleted | ActivityID | RecvTime | City | Quantity | PkgWeight | ShipTime | DeliveryTime |
|---|---|---|---|---|---|---|---|---|
| ... | ... | ... | ... | ... | ... | ... | ... | ... |
| 0 | 1 | SO#256 | <NULL> | <NULL> | <NULL> | 1600 | 8:24am | 12:45pm |
| 1 | 0 | PO#123 | 8:00am | Seattle | 150 | <NULL> | <NULL> | <NULL> |
| ... | ... | ... | ... | ... | ... | ... | ... | ... |

PO_Continuations — 134

| ActivityID | ContinuationToken |
|---|---|
| ... | ... |
| ... | ... |
| ... | ... |

FIG. 9B

CORRELATING PROCESS INSTANCE DATA ACROSS MULTIPLE APPLICATIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to methods and computer systems for monitoring a workflow of a business or other organization. More particularly, the present invention relates to maintaining data for multiple instances of an activity received from multiple sources.

BACKGROUND OF THE INVENTION

Computers, and in particular, computer database applications, are used by businesses and other organizations to monitor and record information about an organization's activities. Often, the organization will have various processes or activities that must be performed, and which recur frequently. Indeed, it is common for an organization to have numerous instances of an activity in various stages of completion at any given time. As one example, a business may sell goods based on orders received from customers. An activity of interest may be fulfilling those customer orders; each purchase order represents a separate instance of that activity. At any particular time, that business may have multiple instances of the activity (i.e., multiple orders from multiple customers) in various stages of completion. As another example, a financial institution may loan funds to customers based on applications from those customers. An activity of interest may be the processing of a loan application to completion (e.g., approval or rejection), with each loan application representing a separate instance of the activity. At any particular time, there may be multiple loan application instances in various stages of processing. As yet another example, a governmental entity responsible for issuing permits may have multiple permit applications in various stages of being processed.

In order to monitor numerous instances of an activity, many organizations store information about those activity instances in a database program. In particular, a record or other data object can be created for each instance of the activity. A separate field or other component of the record is then established to hold a value for some type of information common to each instance. Using one of the previous examples as an illustration, a business selling goods may create a separate database record for each customer order. Within that record may be separate fields for the time the order was received, where the order was received, what was ordered, when the order was shipped, etc. Such use of a database program is often conceptualized as a table. Each instance of the activity is assigned a separate row (or tuple) of the table. Each type of information common to multiple instances is then assigned a separate column of the table.

In many businesses and other organizations, an activity instance database receives input from multiple application programs. An instance may be partially processed by a first application, and the results of that processing stored in the database. The instance may then be further processed by subsequent applications, with each application storing additional information in the database. These applications may not be configured to manipulate activity instance data in a consistent (or even compatible) manner. Indeed, one or more applications may not be aware that another application exists. FIGS. 1-3 provide a more detailed illustration of this problem, and also provide an example to build upon in the subsequent Detailed Description of the Preferred Embodiments.

FIG. 1 is a flow chart showing processing of customer purchase orders by a hypothetical wholesale business. For convenience, the business will be referred to herein as "Business A." At block 10, Business A receives a purchase order and creates a database record for the purchase order; the time of order receipt is also entered. At block 12, additional data is input for record fields corresponding to quantity of product ordered and the purchaser's city. At block 16 a decision is made regarding whether the purchase order will be accepted. If the order is denied, an appropriate field of the record is populated at block 18 and the time of denial recorded. If the purchase order is approved, the approval is noted and a sales order number is assigned (block 20). When the order is packed for shipment, the package weight (PkgWeight) is recorded at block 22. When the order is shipped (block 24), an additional field is populated with the time of shipment. When the order is delivered, the time of delivery is input (block 26).

FIG. 2 is a table representing a portion of the database for purchase order instances of Business A. Each order is on a separate row, and each column corresponds to a type of data for an order. A row in the table of FIG. 2 is created for each instance of the activity at issue (in this case, a purchase order). Certain fields contain NULL values, indicating (in this example) that the value for a particular event is unknown because it has not yet transpired as to that particular purchase order. When a new purchase order is received, a new row is created and some of the fields set to non-null values (e.g., RecvTime, City, Quantity). If the purchase order is later approved and shipped, the package weight (PkgWeight) and ship time (ShipTime) are set to non-null values. When the shipment is received and confirmed, Delivery/Time is set to a non-null value. Process queries against the table can be readily created using well-known SQL (structured query language) coding techniques. A typical query of this database might be "which purchase orders received before 9:00 a.m. have not yet been delivered?" Appendix A shows an implementation of SQL code to create the table of FIG. 2 ("create table PO_InstanceData") and a stored procedure to update the rows of the table in FIG. 2 ("create procedure PO_PrimaryImport").

A stored procedure such as in Appendix A is satisfactory when the purchase order, sales and shipping data is generated from the same program. Unfortunately, this is often not the case. Instead, different parts of a business process are often affected by multiple applications. As shown in FIG. 3, the sales department of Business A uses one application ("application x") to receive and process purchase orders. The shipping department of business A uses another application program (application y) for generating shipping data. The actual delivery of ordered goods is tracked and reported by another application which interfaces with a third party carrier (application z). Each of applications x-z is unaware of the other applications, and has no way to correlate its processing of an instance with processing performed by the other applications.

One solution is to attach a unique identifier to each instance and for each application to then associate data for the instance with that identifier. For example, the purchase order number could be used by all three applications. However, this solution is not practical in many cases. An activity instance may be processed by multiple unrelated organizations (e.g., Business A and the third party carrier of FIG. 3). These different organizations may be unwilling or unable to use the same software or to modify their separate software to track an activity instance using a common identifier. The same problem can occur within a single organization (e.g., the sales and shipping departments of Business A). For example, the shipping department of Business A may be using a legacy application for which modification or replacement would be prohibitively expensive. The example of FIG. 3 is also relatively simple, as only three applications are shown. As more organizations and software applications are added to the processing of an instance, tracking the instance using a global identifier becomes even more problematic.

SUMMARY OF THE INVENTION

The present invention addresses the above and other challenges associated with maintaining information about multiple instances of an activity received from multiple sources. In at least one embodiment of the invention, instance data is transmitted for Payload/Milestone events and for Enable-Continuation events. Payload/Milestone event data contains information describing an instance and/or providing a time of one or more portions of the processing of an instance. Included in the Enable-Continuation event data is an identifier associated with an instance by a first application and an identifier associated with the same instance by another application. The identifiers are placed in a continuation data table which is used to index the appropriate record of an instance data table. In other embodiments, out-of-order data for an instance is hidden from view until sequentially prior data for the instance is received.

In a first embodiment, the invention includes a method for maintaining information about multiple instances of an activity. The method includes receiving process data regarding the instances from each of a plurality of application programs. Continuation data regarding the instances is also received. The continuation data correlates, for each of the instances, process data for the instance received from at least one of the application programs with process data for the same instance received from at least another of the application programs. Process data for each of the instances is inserted into instance database records based on the continuation data. In another embodiment, the invention includes a computer-readable medium having stored thereon instructions which, when executed by a processor, cause the processor to perform steps similar to those of the first embodiment.

These and other features and advantages of the present invention will be readily apparent and fully understood from the following detailed description of preferred embodiments, taken in connection with the appended drawings.

BRIEF DESCRIPTION OF THE DRAWINGS

FIG. 2 is a table representing a portion of a database maintained by the hypothetical business of FIG. 1.

FIGS. 5A-5C show portions of an instance data table and of a continuation data table according to at least one embodiment of the invention.

FIG. 6 is a block diagram showing batch update by multiple applications according to at least one embodiment of the invention.

FIG. 7 is a table showing out-of-order event data.

FIGS. 9A-9C show portions of an instance data table and of a continuation data table according to at least one other embodiment of the invention.

DETAILED DESCRIPTION OF THE PREFERRED EMBODIMENTS

The present invention is described by reference to Structured Query Language (SQL) instructions and other data analysis features found in the SQL SERVER™ 2000 relational database management system (RDBMS) software available from Microsoft Corporation of Redmond, Wash. Although some aspects of SQL instructions that may be used to implement certain embodiments of the invention are described herein, other instructions, programming algorithms and procedures used to implement the invention will be apparent to persons skilled in the art once those persons are provided with the description provided herein. General descriptions of SQL SERVER™ 2000 RDBMS software can be obtained from various sources, including Inside Microsoft® SQL SERVER™ 2000 by Karen Delaney (2001 Microsoft Press) and Microsoft® SQL SERVER™ 2000 Books Online, available at <http://www.microsoft.com/sql/techinfo/productdoc/2000/>. The invention is not limited to implementation using SQL SERVER™ 2000 RDBMS software, and may be implemented using other types of RDBMS software.

Figure 12:
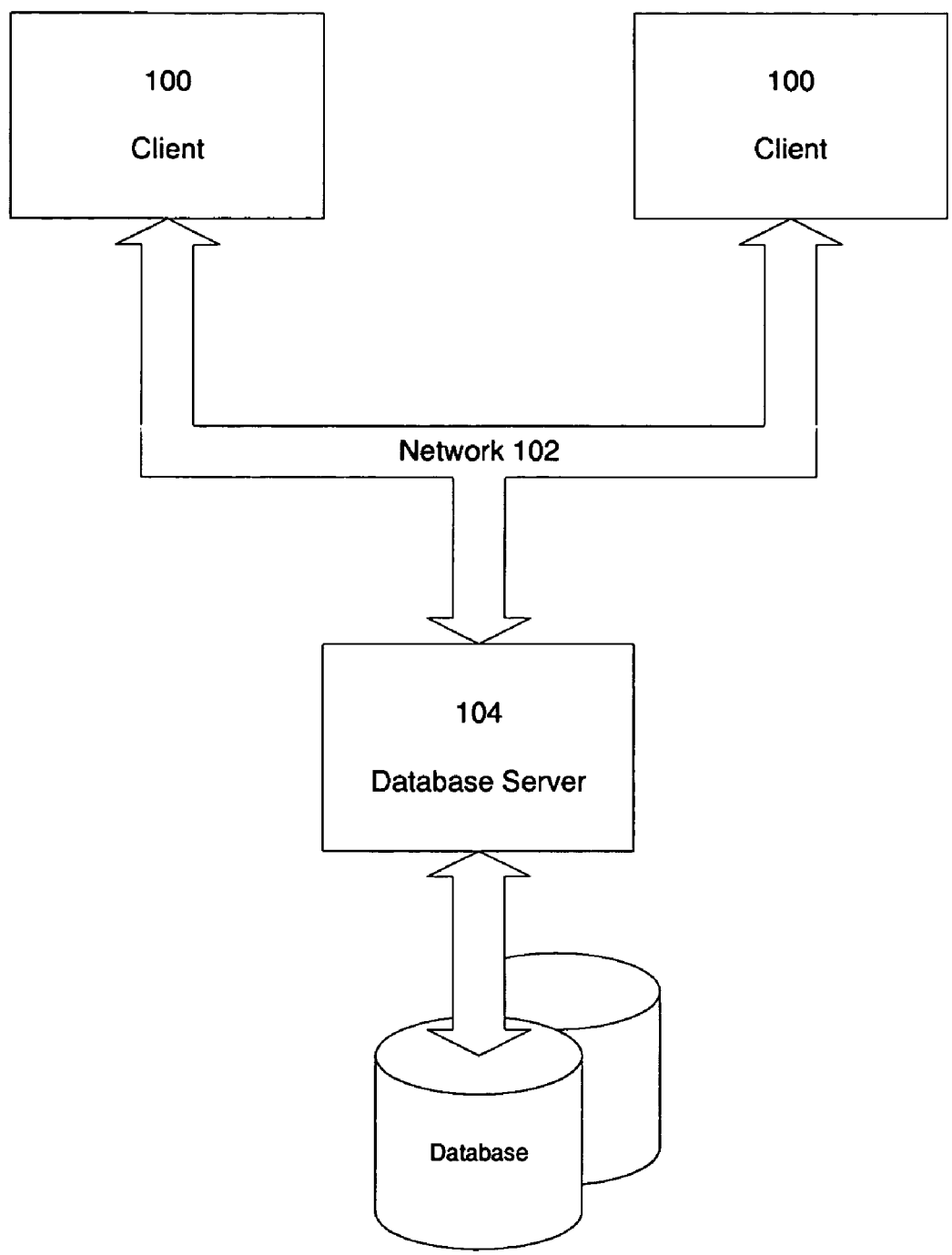
FIG. 12 is a block diagram showing an example of a client-database server environment.

The present invention will also be described by reference to RDBMS software (such as the aforementioned SQL SERVER™ 2000 software) operating on a server and accessed by one or more clients. For example, and as illustrated in the block diagram of FIG. 12, application programs executing on one or more client computers 100 can communicate (via a network 102) with a database server 104. Such configurations are known in the art and thus not extensively described herein. However, a client-server configuration is only one example of a manner in which the invention can be implemented. The invention can also be implemented in other physical system configurations.

Embodiments of the present invention address many of the previously-described challenges of maintaining data for instances of an organizational activity that are acted upon by multiple software applications. In certain embodiments, multiple applications affecting an activity instance are configured to provide data to a database server for at least two types of events. In a Payload/Milestone event, payload (e.g., quantity ordered, purchaser city) or milestone (e.g., time of order receipt) data for an activity instance becomes available for inclusion in an instance data table similar to that of FIG. 2. In an Enable-Continuation event, data becomes available for correlating the processing of an instance by separate applications. This data includes two subcomponents: TraceID and ContinuationToken. The Enable-Continuation event data is used to indicate that, for a given {<TraceID>, <ContinuationToken>} pair, all further events in the context of <ContinuationToken> should be considered as part of <TraceID>.

Figure 1:
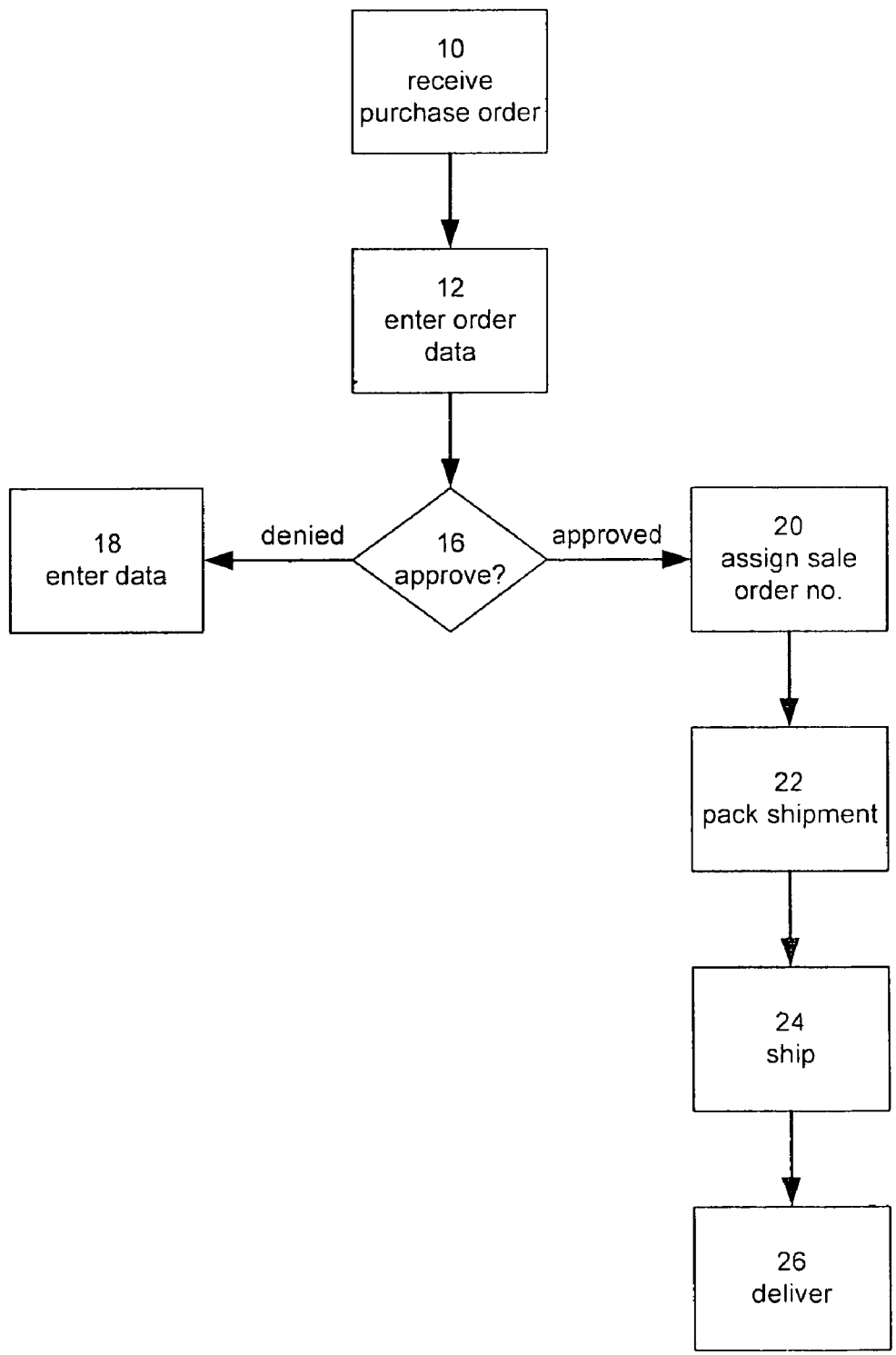
FIG. 1 is a flow chart showing processing of customer purchase orders by a hypothetical wholesale business.
Figure 3:
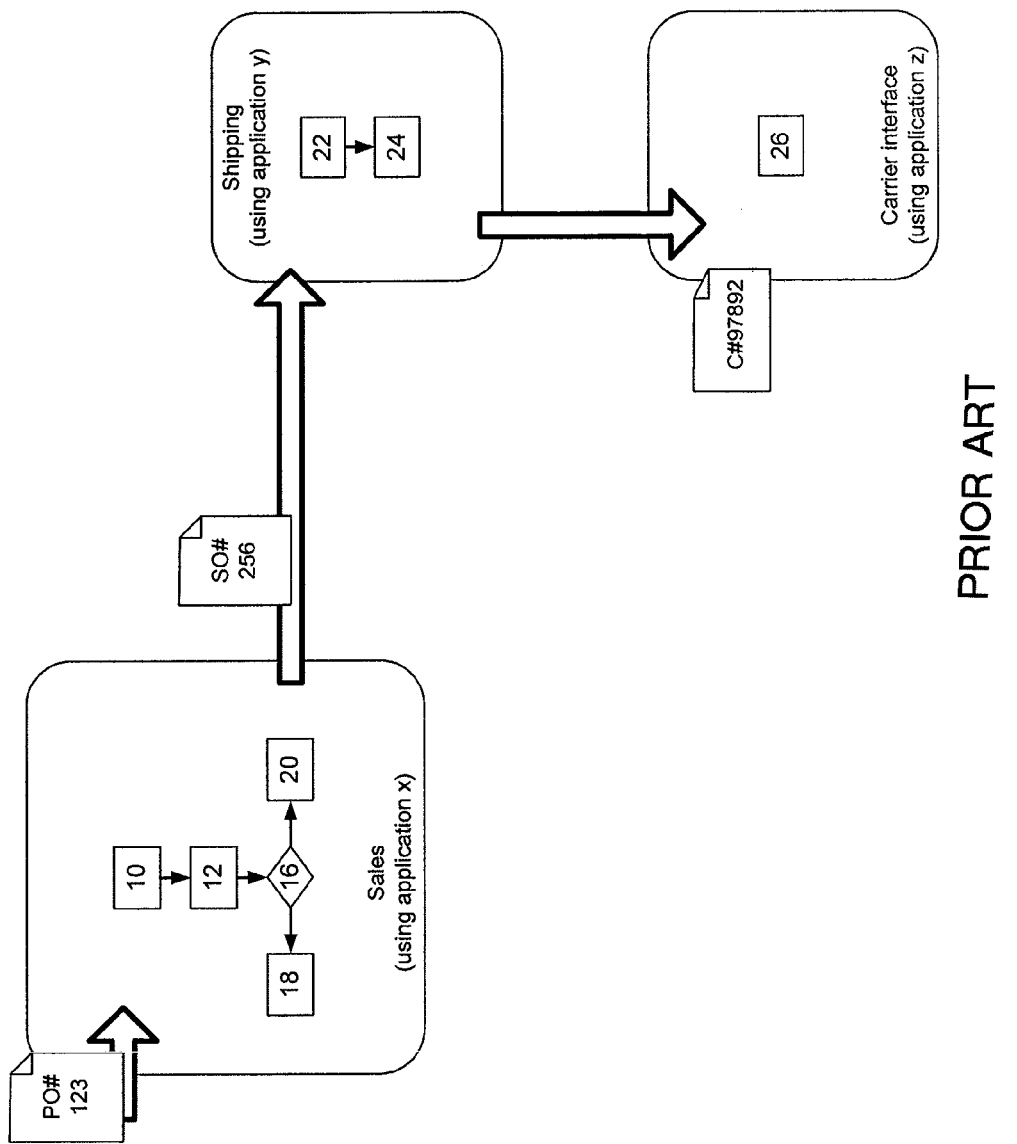
FIG. 3 shows processing of an instance by multiple applications.
Figure 4:
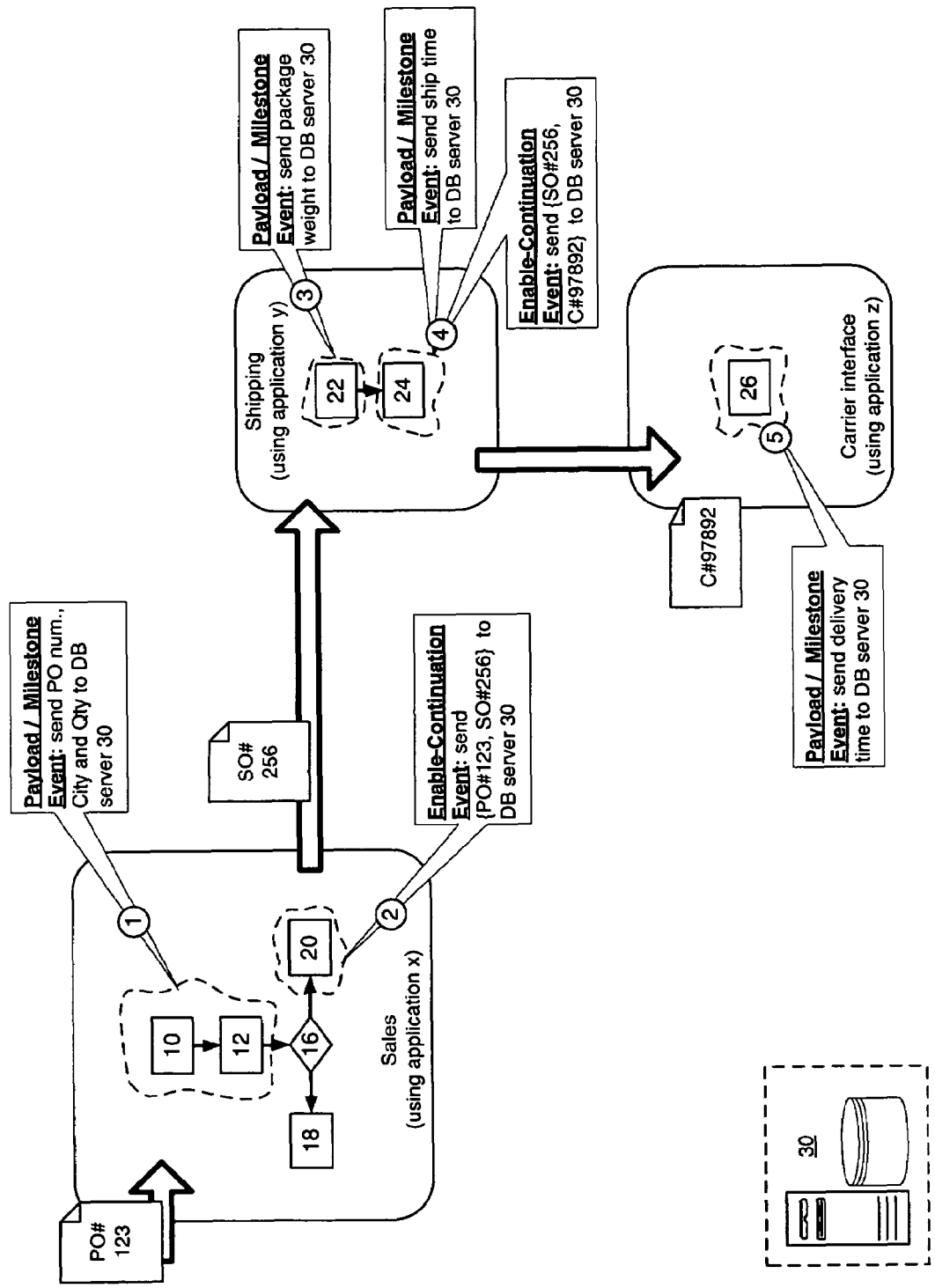
FIG. 4 shows processing of an instance by multiple applications according to at least one embodiment of the invention.

This is further illustrated in FIGS. 4 through 5C, which build upon the previous example of FIG. 3. As shown in FIG. 4, a purchase order (PO#123) is received. Based on the newly-received purchase order, payload data (purchase order number, city of purchaser, and quantity ordered) and milestone data (time or order receipt) is sent to database server 30 at step 1. As shown in FIG. 5A (step 1), a new record is created in instance data table 32 (named "PO_InstanceData"). The purchase order number (PO#123) is inserted in the ActivityID field, time of order receipt (8:00 am) in the RecvTime field, purchaser city (Seattle) in the City field, and the quantity ordered (150) in the Quantity field. Because data for weight of a shipping package (PkgWeight field), time of shipment (ShipTime field) and time of delivery (DeliveryTime) is not yet available, these fields are set to <NULL>. In one embodiment, data for purchase order number, time of receipt, city and quantity are provided to database server 32 by sales department application x. Specifically, application x calls a SQL stored procedure (not shown) which creates a new record in instance data table 32 and populates the appropriate fields. Notably, a human user of application x entering any of the above information into a client computer would not necessarily type (or otherwise explicitly generate) the appropriate SQL commands to implement the stored procedure. For example, a user in the sales department could input the information via a graphical user interface, and one or more levels of intermediate software (executing on the client and/or on database server 30) would generate the stored procedure call with the proper syntax.

Returning to FIG. 4, a sales order number (SO#256) is assigned at step 2. Application x then calls another stored procedure to provide Enable-Continuation event data {PO#123, SO#256} to database server 30. The purchase order number is the TraceID value and the sales order number is the ContinuationToken value. As a result, database server 30 inserts a record in a continuation data table 34 (named "PO_Continuations") (FIG. 5A, step 2). This record acts as a pointer to the record for PO#123 in table 32. In other words, this record in table 34 points to the table 32 record where data for sales order SO#256 should be written.

At step 3 (FIG. 4), payload data for shipment weight becomes available (PkgWeight=1600). Shipping department application y calls a stored procedure which provides this payload data to database server 30 using the sales order number (SO#256) as an identifier for the activity instance. As with sales department application x, a human user of application y would not necessarily type (or otherwise explicitly generate) the appropriate SQL commands to implement the stored procedure, and one or more levels of intermediate software (executing on the application y client and/or on database server 30) could generate the stored procedure call with the proper syntax. Using the value of SO#256 supplied by application y, database server 30 searches table 34, finds PO#123, and then updates the record for PO#123 in table 32 with a value for PkgWeight (FIG. 5B, step 3).

At step 4 (FIG. 4), shipping time milestone data (8:24 am) becomes available. Application y provides the data to database server in a similar manner, causing update of the ShipTime field for the PO#123 record in table 32 (FIG. 5B, step 4). A confirmation number (C#97892) is also received from the third party carrier at step 4 (FIG. 4). Application y then calls another stored procedure to provide Enable-Continuation event data {SO#256, C#97892} to database server 30. The sales order number is the TraceID value and the tracking number is the ContinuationToken value. As a result, database server 30 searches table 34 to find the parent record identifier corresponding to SO#256. Upon finding PO#123 in the table 34 record for SO#256, database server creates a shortcut record {PO#124, C#97892} in table 34 (FIG. 5B, step 4). At the conclusion of step 4, application y completes processing of SO#256. Because no more shipping department events are expected, the {PO#123, SO#256} record is deleted from table 34.

At step 5 (FIG. 4), milestone data for delivery time (12:45 pm) becomes available to application z. For example, application z may be an application configured to retrieve delivery data provided by a third party carrier at an Internet website. Application z calls a stored procedure which provides this payload data to database server 30 using the tracking number (C#97892) as an identifier for the activity instance. As with sales department application x and shipping department application y, the appropriate SQL commands to implement the stored procedure could be executed by one or more levels of intermediate software (executing on the application z client and/or on database server 30). Using the value of C#97892 supplied by application z, database server 30 searches table 34 and finds PO#123, and then updates the record for PO#123 in table 32 with a value for DeliveryTime of 12:45 pm (FIG. 5C, step 5). At the conclusion of step 5, application z completes processing of C#97892. Because no more delivery events are expected (as the goods have been delivered), the {PO#123, C#97892} record is deleted from table 34.

Using the forgoing procedure, instance data table 32 (PO_InstanceData) was updated during various steps of processing by separate applications. Minimal data was communicated between the applications (the tracking number received by application y from application z, the sales order received by application y from application x), but none of the applications required modification so as to track or process an activity instance using some other application's identifier.

The example of FIGS. 4 and 5A-5C assumes that Payload/Milestone events and Continuation-Enable events result in immediate and synchronous calls to stored procedures to update table 32 with payload and milestone data. In other words, FIGS. 4 and 5A-5C assume that for a given instance, sales department data (tracked by purchase order number) is always entered first, followed by sales order number, followed by shipping department data (tracked by sales order number), etc. In some cases, however, this may not be feasible. For example, continuous data network access may not be available for all applications providing payload or milestone data. As another example, there may be undesirable performance consequences if numerous applications have continuous access to database server 30. For these and other reasons, data for activity instances can therefore be stored within tables maintained by the individual applications (such as applications x-z), and then concentrated within a central database (maintained by database server 30) by batch updates. FIG. 6 shows one example of such a configuration. Once data is concentrated in a central database, additional data transformation services and analysis (e.g., Online Analytical Processing, or OLAP) may be performed. Asynchronously updating a database in a manner such as shown in FIG. 6 may also have less performance impact upon the individual applications than would occur if each application immediately updated payload and milestone data as it became available.

However, concentration of data for batch update by applications (such as shown in FIG. 6) presents another challenge. Specifically, the event data may be updated to database server 30 out of order. Using the previous example of FIGS. 4 and 5, event data for a shipment identified by tracking number C#97892 could arrive before any event data identified by purchase order PO#123 or sales order SO#256. As shown in FIG. 7, this out-of-order data update could cause an instance data table to contain numerous anomalous records. According to the table of FIG. 7, numerous orders (C#97892, C#97893 and C#97894) have been delivered, but were not ordered or shipped. Performing business analyses on such data can present difficulties. For example, ShipTime≠<NULL> cannot be used as a criterion for determining how many orders have been shipped. If this criterion were used, the analysis would miss instances for which there is DeliveryTime data, but for which receipt of ShipTime data is still be pending. As another example, it would be difficult to determine percentage of delivered orders based on quantity. Although it is sometimes possible to analyze out-of-order data using more complex queries and knowledge of the actual process structure, this can be difficult, time-consuming and error-prone. For example, querying a table such as FIG. 7 in a simplistic way for the percentage of shipped orders already delivered results in a "divide by zero" exception if the data from shipping application y has not arrived, and results in more than 100% if only some of application y data has been processed.

Although a potential source of problems, out-of-order data is a transient situation. The instance data will be consistent once the missing event data is transferred from the appropriate applications. By hiding out-of-order data from users and from analytical processing of the instance data table, many potential problems are avoided. In exchange for a small increase in latency (i.e., until all relevant event data is added to the instance data table), users and analysis applications are presented with consistent data.

In the example of FIGS. 4 and 5, there are 5!=120 possible orders in which the data from steps 1 through 5 could be received by database server 30. However, in the case of applications x and y, one application performs two steps (application x provides event data at steps 1 and 2 and application y provides event data at steps 3 and 4). If event data within an application is ordered before concentration in database server 30, the number of possible combinations is reduced. For example, the combinations 2-1-3-4-5 and 1-2-4-3-5 would not occur if applications x and y ordered their data before update to database server 30. In some embodiments, event data is ordered within an application by synchronously writing the data to a separate database (maintained by the application) or by synchronously buffering the data in memory prior to writing the data to database server 30. In other embodiments, each application associates an incremental counter value with event data and sorts the event data prior to writing the event data to database server 30.

Figure 8:
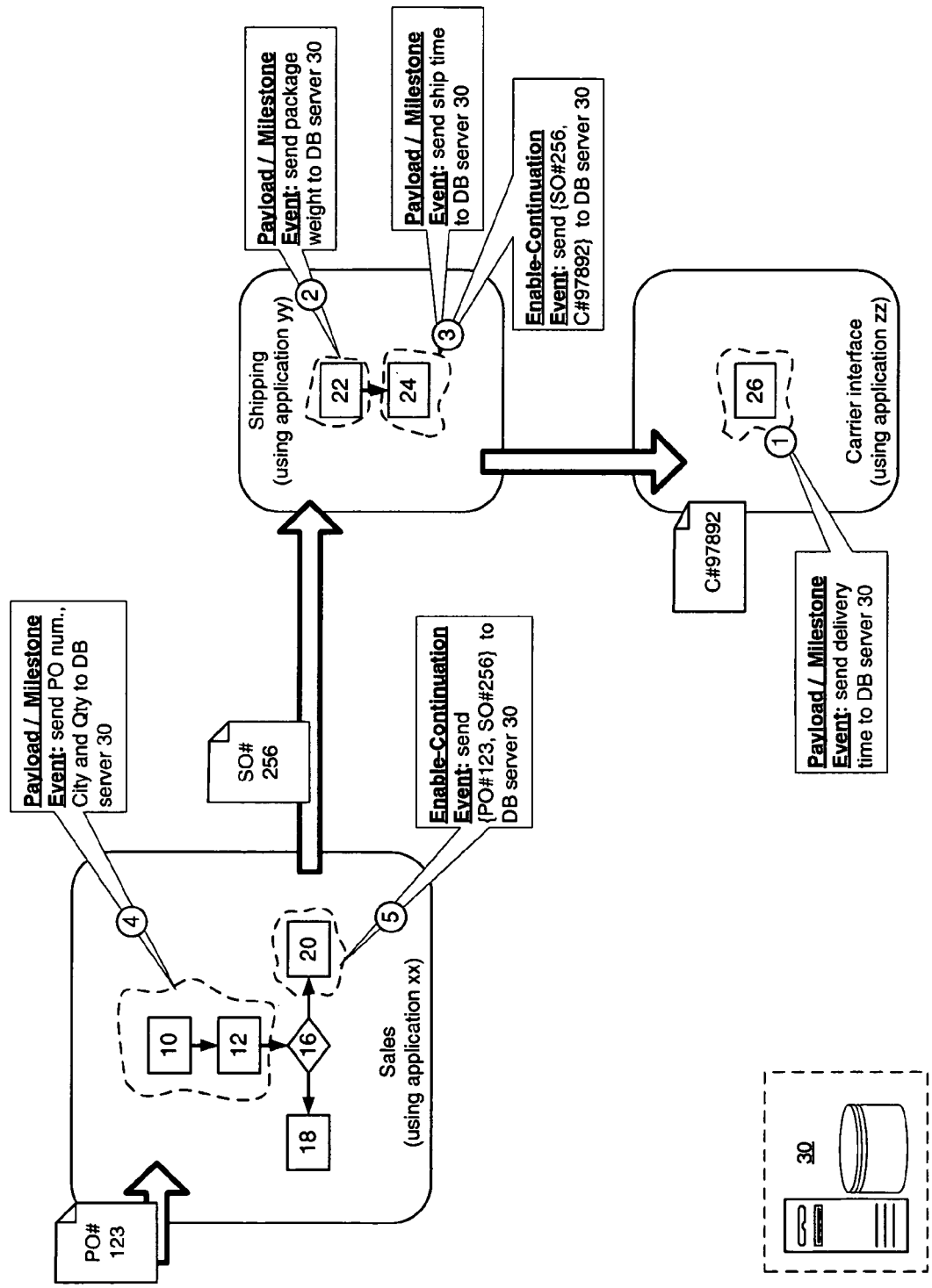
FIG. 8 shows processing of an instance by multiple applications according to at least one other embodiment of the invention.
Figure 9C:
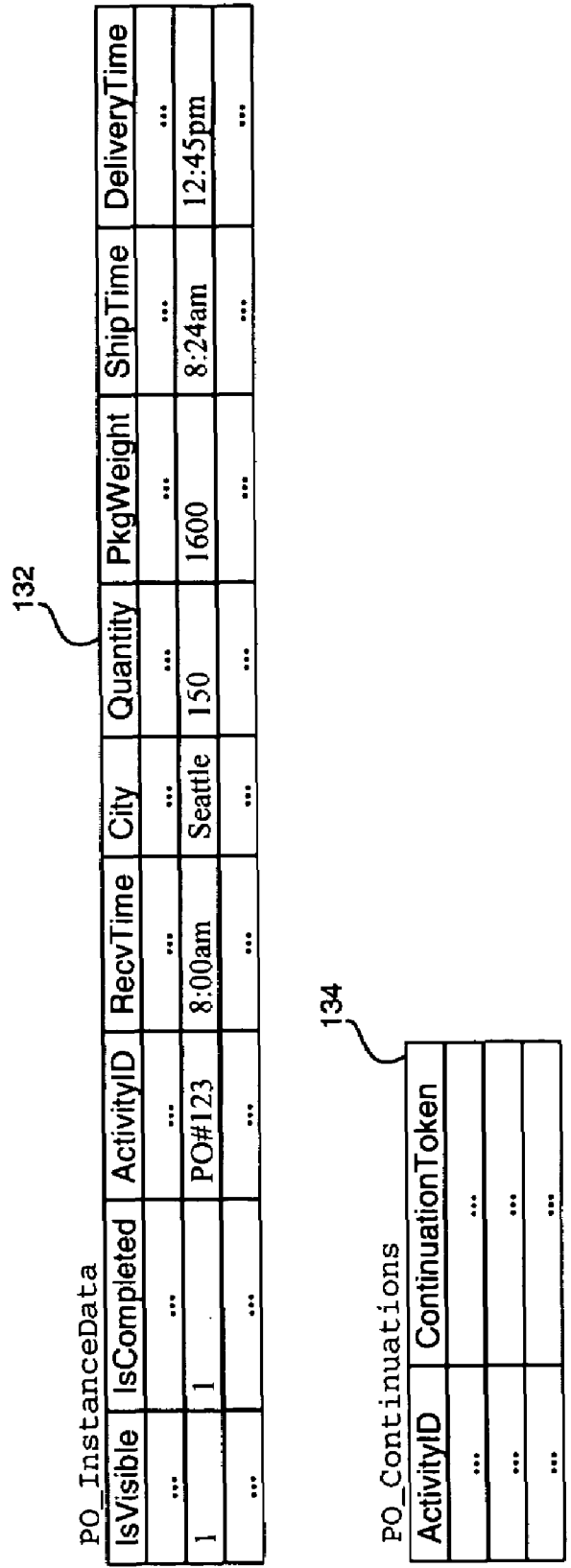

FIGS. 8 and 9 illustrate operation of at least one embodiment of the invention in which out-of-order event data is hidden from users and from analysis applications. FIG. 8 is similar to FIG. 4, but the order in which applications xx, yy and zz transmit event data is different from the order in which applications x, y and z transmit event data. FIGS. 9A-9C are similar to FIGS. 5A-5C, and show update of instance data table 132 (also named PO_InstanceData) and continuation data table 134 (also named PO_Continuations). However, instance data table 132 contains two additional "system" columns. In at least some embodiments, "IsVisible" is set to 1 at the event that signifies the beginning of a new activity instance and 0 in all subsequent events. "Completed" is set to 1 when an application has completed processing an activity instance.

In step 1 of FIG. 8, database server 30 receives an event data batch transmission from application zz. This data contains payload data for DeliveryTime of 12:45 pm associated with carrier tracking number C#97892. Because there is no record in continuation data table 134 having a ContinuationToken value of C#97892, this particular event data cannot be associated with a purchase order number or sales order number. Accordingly, a new record is created in instance data table 132 having the ActivityID field set to C#97892 and the DeliveryTime field set to 12:45 pm (FIG. 9A, step 1). IsVisible is set to 0, as the event does not correspond to the beginning of a new activity instance, and this record contains inconsistent (in this case, out-of-order) event data. Specifically, this record indicates goods have been delivered, but does not indicate that those goods have been ordered or shipped. IsCompleted is set to 1, as no more event data regarding C#97892 is expected from application zz. In this particular example, processing of an instance by application zz is defined to be complete when goods are delivered. In other applications within the present embodiment and in other embodiments involving other types of activity instances, completion is defined differently.

In step 2 of FIG. 8, database server 30 receives an event data batch transmission from application yy. Step 2 of FIG. 8 is similar to step 3 of FIG. 4. In particular, the data from application yy contains payload data for a PkgWeight value of 1600 associated with a sales order number SO#256. Because there is no record in continuation data table 134 having SO#256 as a ContinuationToken value, this particular event data cannot be associated with a purchase order number. A new record is created in instance data table 132, the ActivityID field in that record is set to SO#256, and the PkgWeight field set to 1600 (FIG. 9A, step 2). IsVisible is set to 0, as the event does not correspond to the beginning of a new activity instance, and this record contains inconsistent (in this case, out-of-order) event data. Specifically, this record indicates goods have been packaged, but does not indicate that those goods have been ordered. IsCompleted is set to 0, as more event data regarding SO#256 is expected from application yy. In this particular example, processing of an instance by application yy is defined to be complete when goods are shipped.

In step 3 of FIG. 8, database server 30 receives another event data batch transmission from application yy. Step 3 of FIG. 8 is similar to step 4 of FIG. 4. Enable-Continuation event data {SO#256, C#97892} is received, together with payload data for a ShipTime value of 8:24 am associated with SO#256. Based on this information, and as shown in FIG. 9B, the record in instance data table 132 having ActivityID C#97892 is merged with the record having ActivityID SO#256, and the ShipTime field for this merged record is set to 8:24 am. In this particular example, a record is not created in continuation data table 134 for {SO#256, C#97892}, as processing by application zz is complete.

In step 4 of FIG. 8, database server 30 receives an event data batch transmission from application xx. Step 4 of FIG. 8 is similar to step 1 of FIG. 4. In particular, payload data for RecvTime (8:00 am), City (Seattle) and Quantity (150) associated with an ActivityID of PO#123 are received. Because no relationship with a sales order number or carrier tracking number are found in continuation data table 134, a new record is created in instance data table 132 (FIG. 9B, step 4). IsVisible is set to 1, as this is the start of a new activity instance. Although there is additional event data in instance data table 132 for this instance, that additional data is not displayed because its relationship to PO#123 is not yet known. IsCompleted is set to 0, as no sales order number has been assigned.

At step 5 of FIG. 8, database server 30 receives the Enable-Continuation data {PO#123, SO#256}. As shown in FIG. 9C, data in the hidden record for SO#256 is merged with the record for PO#123, and the SO#256 record deleted. IsVisible is set to 1, as one of the merged records has a value of 1 for the IsVisible flag. IsCompleted is also set to 1 in FIG. 9C. Because no more event data is expected, there is no need to create a record in table 134.

As shown in FIGS. 8 through 9C, the ultimate result is the same as in FIGS. 4 through 5C, notwithstanding the out-of-order processing of various event data. In exchange for a normally small amount of latency, users and analysis applications are presented with consistent data.

Figure 10:
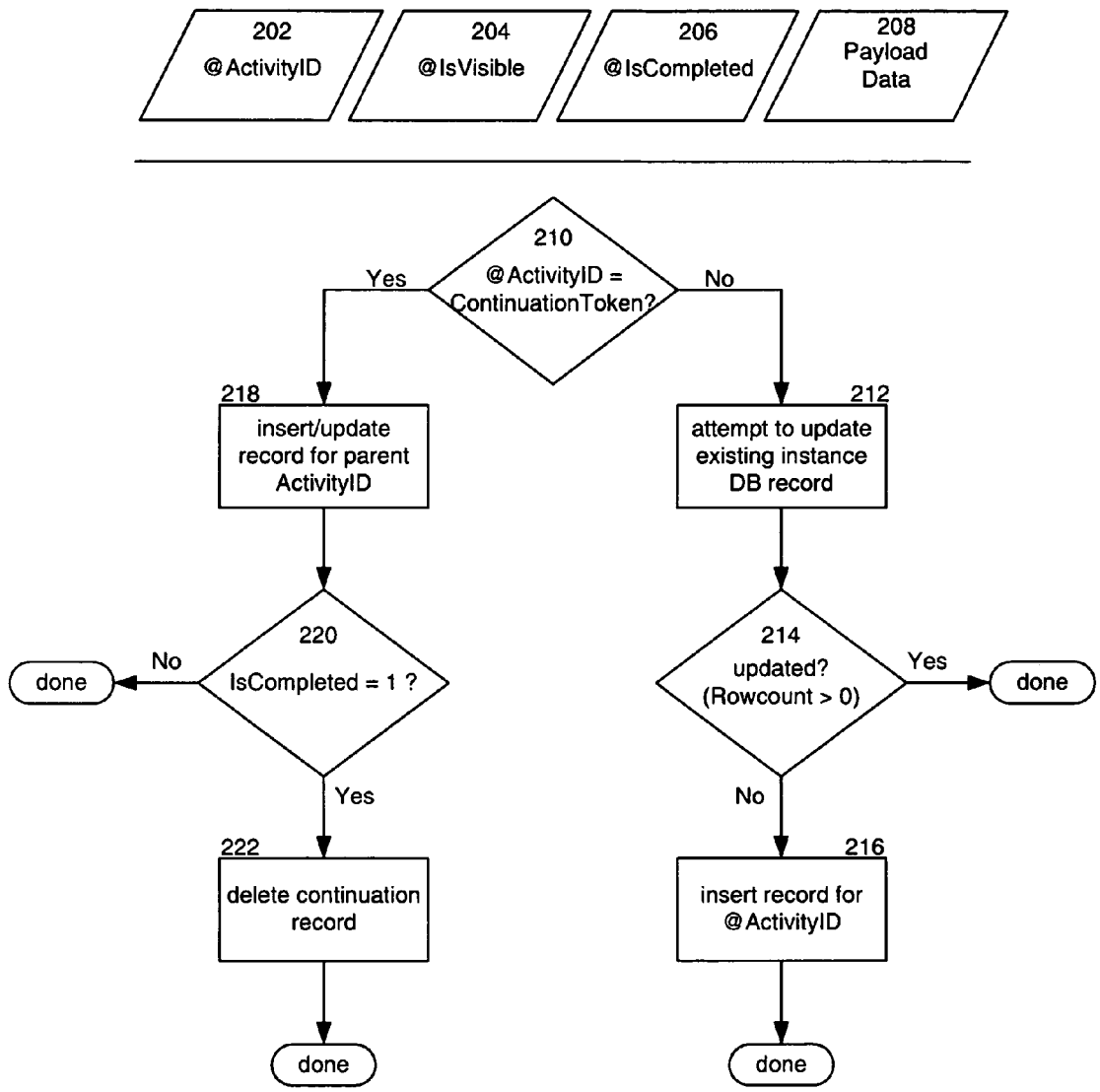
FIG. 10 is a flow chart according to at least one embodiment of the invention for a stored procedure to insert and update data into an instance data table.

FIG. 10 is flow chart showing operation of a stored procedure for inserting and updating payload and milestone data into instance data table 32 or 132. Calls to this stored procedure include the following arguments:

202 A value for ActivityID (e.g., PO#123, SO#256 or C#97892).

204 A value for the IsVisible flag. The value is set to 1 if the call is associated with an ActivityID for a root event for the activity instance. In the preceding example, the root event is the receipt of a purchase order, but the root event could be defined otherwise. If the stored procedure call is not associated with a root event, the IsVisible flag is set to 0 within the argument.

206 A value for the IsCompleted flag. The value is set to 1 if the data corresponds to the last event for the application calling the stored procedure. Otherwise, the value is 0.

208 Payload and milestone data (e.g., values for Recv-Time, Quantity, etc.).

Figure 11:
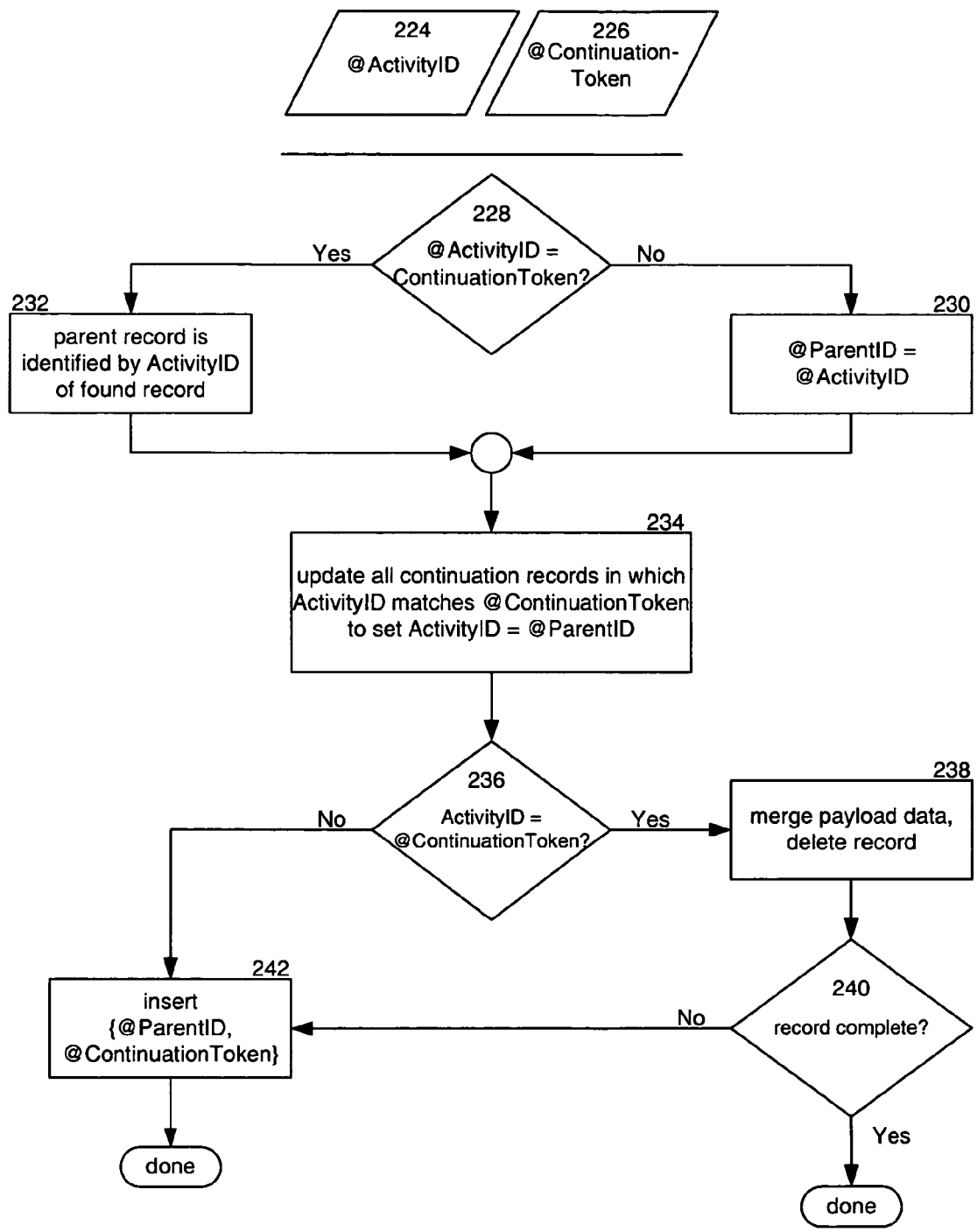
FIG. 11 is a flow chart according to at least one embodiment of the invention for a stored procedure to process Enable-Continuation event data.

In the discussion to follow regarding FIGS. 10 and 11, variables for which data is included in a stored procedure call are preceded with an "@" to indicate that the local to that stored procedure call.

At block 210, the stored procedure determines whether data in the arguments will potentially update an existing parent record. In the present embodiment, a parent record has either the same ActivityID value as is contained in the stored procedure call (ActivityID=@ActivityID), or has an ActivityID value assigned by a previous application and linked to @Activity by a record in continuation data table 134. If there is no record in continuation table 134 where the ContinuationToken value is the same as @ActivityID, the stored procedure attempts at block 212 to update (with values from blocks 204, 206 and 208) an existing record in instances data table 132 where ActivityID=@ActivityID. At block 214, the stored procedure determines if the update attempt at block 212 succeeded (e.g., by using the SQL "rowcount" command to determine if any rows of instance data table 132 were updated). If the update succeeded (the "yes" branch of block 214), the stored procedure terminates. If the update did not succeed (the "no" branch), the stored procedure creates a new record in instances data table 132 at block 216. The values for ActivityID of that record is set to the ActivityID value (@ActivityID) in the call, and other fields are set to other values contained in the call (e.g., IsVisible=@IsVisible, IsCompleted=@IsCompleted, City=@City, ShipTime=@ShipTime, etc.).

If the call to the stored procedure is from a root event for the instance, the stored procedure will always proceed on the block 210 to block 212 branch, similar to the stored procedure of Appendix A. If the stored procedure is called by a continuation of some other portion of the instance processing, execution will proceed along this branch only if the data in the call arguments are received before Enable-Continuation event data linking the continuation to a parent record. In such case, a new hidden record (IsVisible=0) is inserted into the instance data table.

If at block 210 the stored procedure locates a record in continuation data table 134 having a ContinuationToken value equal to @ActivityID, an existing parent record has potentially been identified. In such case, the parent record is updated or inserted at block 218. If the parent application has previously provided Enable-Continuation data, but no payload or milestone data (e.g., if step 5 of FIG. 8 were instead step 1), the located continuation data table record may point to a non-existent record in the instances data table. In such case, a new instances data record is inserted at step 218. If the located continuation data table record points to an existing instances data record (e.g., the parent application has previously sent continuation data and payload or milestone data), the existing instances data record is updated at step 218. The updated record will have the parent ActivityID, not @ActivityID. At block 220, the stored procedure determines if the application calling the stored procedure has finished processing the instance (IsCompleted=1 ?). If no, the stored procedure terminates. If yes, the stored procedure continues to block 222. Because no more events are expected from the application calling the stored procedure, the continuation table record located at block 210 is deleted so as to eliminate unnecessary records in continuation data table 134. After block 222, the stored procedure terminates.

FIG. 11 is a flow chart showing operation of a stored procedure for processing Enable-Continuation event data in the embodiments of FIGS. 4 and 8. In at least some embodiments, this stored procedure creates "shortcut" records in continuation data table 134 such that each record in table 134 points directly to the instance record to be updated. In this manner, the stored procedure of FIG. 10 is able to find a parent record without using recursion.

An application calling the stored procedure of FIG. 11 provides two arguments. The first argument (@ActivityID, block 224) is the ActivityID value associated with the instance by the application calling the stored procedure. The second argument (@ContinuationToken, block 226) is the ActivityID value for the event(s) expected to follow the current event from another application. At block 228, the stored procedure determines if there is a parent record for the instance with regard to which the stored procedure has been called. In particular, the stored procedure searches continuation data table 134 for a record having a ContinuationToken value equal to @ActivityID from block 224. If no such record is found, the stored procedure continues to block 230 and assumes that the stored procedure was called with regard to an ActivityID value for a parent record. At block 230, the local variable @ParentID is set to the value of @ActivityID from block 224.

If at block 228 a record was found in continuation data table 134 having a ContinuationToken value equal to @ActivityID from block 224, the stored procedure branches to block 232. At block 232, the record identified at block 228 is used as an index to a parent record in instances data table 132, and the @ParentID local variable is set the ActivityID value of the indexed record.

From block 230 or block 232, the stored procedure continues to block 234. At block 234, the relevant continuation records in continuation data table 134 are updated to point directly to the parent record found in block 232 or in block 230. In particular, the stored procedure locates all records in continuation data table 134 where the value for ActivityID matches the value of @ContinuationToken from block 226, and then sets the ActivityID value in those records to the value for @ParentID (set in either block 230 or block 232).

In block 236, the stored procedure determines if there are any existing records in instances data table 132 where the value for ActivityID matches the value of @ContinuationID from block 226. If yes, the stored procedure continues to block 238. At block 238, the stored procedure merges the payload and milestone data in the instances data table 132 record where ActivityID=@ContinuationToken with the data in the table 132 record where ActivityID=@ParentID. At block 240, the stored procedure determines whether the merged record is complete (i.e., all fields have non-null values). If yes, the stored procedure terminates. If no, the stored procedure continues to block 242. At block 242, which the stored procedure could also reach from the "no" branch of block 236, a new record is inserted into continuation data table 134 for {@ParentID, @ContinuationToken}. From block 242, the stored procedure terminates.

Although the invention has been described using a hypothetical business type as an example, it should be remembered that the invention is not limited to a particular type of business, organization or activity. Moreover, the invention is not limited to implementations in which instance data is only provided by three applications, or in which an application only provides instance or continuation data in the limited manner shown in the preceding examples. For example, a single application may provide payload/milestone data regarding a single instance 5, 10, 50 or any number of times. Similarly, an application may transmit Enable-Continuation event data for instances more than once. Accordingly, although specific examples of carrying out the invention have been described, those skilled in the art will appreciate that there are numerous variations and permutations of the above described systems and techniques that fall within the spirit and scope of the invention as set forth in the appended claims. These and other modifications are within the scope of the invention as defined by the appended claims.

APPENDIX A

```
create table PO_InstanceData
(
    PONum int primary key,
    RecvTime datetime null,
    City nvarchar(50) null,
    Quantity int null,
    ShipTime datetime null,
    PkgWeight float null,
    DeliveryTime datetime null
)
go
create procedure PO_PrimaryImport
(
    @PONum int,
    @RecvTime datetime=null,
    @City nvarchar(50)=null,
    @Quantity int=null,
    @ShipTime datetime=null,
    @PkgWeight float=null,
    @DeliveryTime datetime=null
)
as
begin
update PO_InstanceData
set
    RecvTime=coalesce(@RecvTime, RecvTime),
    City=coalesce(@City, City),
    Quantity=coalesce(@Quantity, Quantity),
    ShipTime=coalesce(@ShipTime, ShipTime),
    PkgWeight=coalesce(@PkgWeight, PkgWeight),
    DeliveryTime=coalesce(@DeliveryTime, DeliveryTime)
where PONum=@PONum
if @@rowcount=0
insert PO_InstanceData values
```

-continued

```
    (@PONum, @RecvTime, @City, @Quantity, @ShipTime,
    @DeliveryTime)
end
```

The invention claimed is:

1. In a system that includes a plurality of applications that perform different portions of a business process and that each represent data of the business process using a different identifier, a method for correlating the data of an instance of the business process generated by the applications, the method being performed by a processor in the system, the method comprising:

subsequent to a first application performing a portion of the business process, receiving first data from the first application that was generated during the performance of the business process, the first data being represented with a first identifier;

creating a record in an instance data table that stores the first identifier and the first data in fields of the record, the record including additional fields for data to be subsequently received, wherein the first identifier is stored in the record such that data entered into the additional fields is represented by the first identifier;

subsequent to the first application completing its portion of the business process, receiving a correlation event that includes the first identifier and a second identifier, the second identifier corresponding to a second application that performs a subsequent portion of the business process such that the second application represents data generated during the performance of the subsequent portion of the business process using the second identifier, the first identifier being different from the second identifier;

creating a record in a continuation data table that stores the first identifier in conjunction with the second identifier;

subsequent to the second application performing the subsequent portion of the business process, receiving second data from the second application that was generated during the performance of the business process, the second data being represented with the second identifier;

accessing the record in the continuation data table to determine that the second data represented by the second identifier corresponds with the first data stored in the record of the instance data table and represented by the first identifier;

storing the second data in the additional fields of the record in the instance data table such that the second data is also represented by the first identifier;

subsequent to the second application completing its portion of the business process, receiving a correlation event that includes the second identifier and a third identifier, the third identifier corresponding to a third application that performs a subsequent portion of the business process such that the third application represents data generated during the performance of the subsequent portion of the business process using the third identifier, the third identifier being different than the first and second identifiers;

searching the continuation data table for a record that includes the second identifier;

determining based on the record stored in the continuation data table that the second identifier is correlated with the first identifier creating a new record in the continuation data table that correlates the first identifier with the third identifier;

subsequent to the third application performing the subsequent portion of the business process, receiving third data from the third application that was generated during the performance of the business process, the third data being represented with the third identifier;

accessing the record in the continuation table that stores the first and third identifiers to determine that the third data represented by the third identifier corresponds with the first data stored in the record of the instance data table and represented by the first identifier; and storing the third data in the additional fields of the record in the instance data table such that the third data is also represented by the first identifier.

2. The method of claim 1 further comprising upon creating the new record, deleting the record that stores the first and second identifiers from the continuation data table.

3. The method of claim 1 wherein the first application receives the second identifier from the second application and the second application receives the third identifier from the third application, but no other communications occur between the applications.

4. A non-transient computer readable storage medium that stores computer executable instructions which when executed by a processor perform the method of any of claims 1-3.

5. In a system that includes a plurality of applications that perform different portions of a business process and that each represent data of the business process using a different identifier, a method for correlating the data of an instance of the business process generated by the applications, the method being performed by a processor in the system, the method comprising:

subsequent to an application performing a portion of the business process, receiving data from the application that was generated during the performance of the business process, the data being represented with an identifier;

searching a continuation data table, that stores correlated identifiers, for a record that includes the identifier such that:

upon locating a record that includes the identifier, a correlating identifier is retrieved from the record and used to locate a record in an instance data table that includes data represented by the correlating identifier, and upon locating the record in the instance data table, the data represented by the identifier is inserted into the record in the instance data table; and upon failing to locate a record that includes the identifier, a new record is added to the instance data table that includes the data and the identifier;

subsequent to the application completing its portion of the business process, receiving a correlation event that includes the identifier and a subsequent identifier, the subsequent identifier corresponding to a subsequent application that performs a subsequent portion of the business process such that the subsequent application represents data generated during the performance of the subsequent portion of the business process using the subsequent identifier, the identifier being different from the subsequent identifier; and searching the continuation data table for a record that includes the identifier in conjunction with a different identifier such that:

upon locating a record that includes the identifier, a new record is added to the continuation data table that correlates the different identifier with the subsequent identifier; and upon failing to locate a record that includes the identifier, a new record is added to the continuation data table that correlates the identifier with the subsequent identifier.

6. The method of claim 5 wherein the different identifier corresponds with a first application, the identifier corresponds with a second application, and the subsequent identifier corresponds with a third application, wherein the first application performs a beginning portion of the business process, the second application performs an intermediate portion of the business process, and the third application performs an ending portion of the business process.

7. The method of claim 5 wherein the record in the instance data field further includes a first field for indicating whether the data in the record is visible to outside entities, and a second field for indicating whether the application corresponding to the identifier included in the record has completed it's portion of the business process.

8. The method of claim 7 wherein the first field being set indicates that the record stores data from an application that performs a portion of the business process that is performed after a preceding portion for which no data has been received.

9. The method of claim 7 wherein if the first field is set, the data of the record will not be returned in response to a query that matched the data.

10. The method of claim 5 wherein the portion of the business process performed by the application includes multiple actions that each generate data, and wherein the generated data from all the actions are received in a batch that is pre-sorted by the application.

11. A non-transient computer readable storage medium that stored computer executable instructions which when executed by a processor perform the method of any of claims 5-10.

* * * * *

UNITED STATES PATENT AND TRADEMARK OFFICE
CERTIFICATE OF CORRECTION

PATENT NO.       : 7,693,916 B2
APPLICATION NO.  : 10/750885
DATED            : April 6, 2010
INVENTOR(S)      : Gueorgui Bonov Chkodrov et al.

Page 1 of 1

It is certified that error appears in the above-identified patent and that said Letters Patent is hereby corrected as shown below:

Column 9, line 10, after "FIG. 10 is" insert -- a --.

Column 9, line 31, after "indicate that the" insert -- variables are --.

Column 12, line 67, in Claim 1, delete "identifier" and insert -- identifier; --, therefor.

Column 14, line 35, in Claim 7, delete "it's" and insert -- its --, therefor.

Column 14, line 42, in Claim 9, delete "matched" and insert -- matches --, therefor.

Column 14, line 49, in Claim 11, delete "stored" and insert -- stores --, therefor.

Signed and Sealed this
Twenty-eighth Day of August, 2012

David J. Kappos
*Director of the United States Patent and Trademark Office*